(12) United States Patent
Ripp et al.

(10) Patent No.: US 7,664,704 B2
(45) Date of Patent: Feb. 16, 2010

(54) CLEARING RECEIVABLES WITH IMPROVED SEARCH

(75) Inventors: Volker Ripp, Mannheim (DE); Nitin Bansal, Bangalore (IN); Dietmar Nowotny, Dielheim (DE)

(73) Assignee: SAP AG, Walldorf (DE)

( * ) Notice: Subject to any disclaimer, the term of this patent is extended or adjusted under 35 U.S.C. 154(b) by 425 days.

(21) Appl. No.: 11/322,570

(22) Filed: Dec. 30, 2005

(65) Prior Publication Data

US 2007/0156583 A1 Jul. 5, 2007

(51) Int. Cl.
*G06Q 40/00* (2006.01)
(52) U.S. Cl. ....................................... 705/43
(58) Field of Classification Search ............... 705/1–46; 235/379; 341/50, 51, 106; 370/230; 386/46; 706/46; 707/1, 3, 102; 709/217; 725/34, 725/46
See application file for complete search history.

(56) References Cited

U.S. PATENT DOCUMENTS

| | | | |
|---|---|---|---|
| 6,741,985 B2 * | 5/2004 | Green | 707/5 |
| 2002/0123991 A1 * | 9/2002 | Asami et al. | 707/3 |
| 2002/0129012 A1 * | 9/2002 | Green | 707/3 |
| 2002/0194174 A1 * | 12/2002 | Calkins et al. | 707/6 |
| 2003/0167228 A1 * | 9/2003 | Waida et al. | 705/40 |
| 2003/0220855 A1 * | 11/2003 | Lam et al. | 705/34 |
| 2004/0107205 A1 * | 6/2004 | Burdick et al. | 707/102 |
| 2004/0172360 A1 * | 9/2004 | Mabrey et al. | 705/40 |
| 2004/0236660 A1 * | 11/2004 | Thomas et al. | 705/37 |
| 2005/0075960 A1 * | 4/2005 | Leavitt et al. | 705/35 |
| 2005/0120039 A1 * | 6/2005 | Amys et al. | 707/102 |

OTHER PUBLICATIONS

Easing into SQL—There's good reason for Access programmers to learn SQL. We show you how to make the process easier (Technology Tutorial), Harkins, Susan Sales, PC Magazine, 102, Mar. 20, 2001.*

* cited by examiner

*Primary Examiner*—James P Trammell
*Assistant Examiner*—Tien C Nguyen
(74) *Attorney, Agent, or Firm*—Schwegman, Lundberg & Woessner, P.A.

(57) ABSTRACT

A system and method match payments with invoices. A payment is received from a business partner. Multiple fields of an invoice database are concatenated to form a single string per record, and a search for an invoice corresponding to the payment is performed. The search may be a fuzzy search based on a search string created from information associated with the payment.

24 Claims, 4 Drawing Sheets

| BUSINESS PARTNER | INVOICE DATE | INVOICE NUMBER | INVOICE AMOUNT | CONTRACT NUMBER | ... |
|---|---|---|---|---|---|
| ACME INC. | 23/11/2005 | 9742 | 1132.00 | 6396 | |
| | | | | | |
| ⋮ | | | | | |

→ ACME INC. 23/11/2005 9742 1132.00 ~330

⇩

340 ~ SEARCH STRING: "ACME AND 9724 AND 1132"
                                           345      350

*FIG. 3*

CLEARING RECEIVABLES WITH IMPROVED SEARCH

BACKGROUND

Many businesses have customers or business partners that they invoice regularly to inform the customers or business partners of amounts that are due for the goods and/or services provided. Payments from customers may come in many forms, from wire transfers, checks, credit card payments and other forms of money transfer. In many such payments, information is provided to help match up the payment with the amounts that are due, which may be referred to as clearing the payments. The amounts due may be referred to as receivables. It can be difficult to precisely match the payments with the receivables because sometimes there is no reference on the check to an invoice number, or the invoice number provided is incorrect. Multiple invoices may be for the same amount, so the amount alone may not be sufficient to match a payment to the invoice. To further complicate matters, different operational units within the business may invoice different operational units within the customer. Still further, many different customers may be invoiced with the same amount. Payments may not even reference the customer in some situations.

While most payments reference an invoice, leading to an easy matching of receivables to payments, some payments are very difficult to clear. With the complexity described above, data base searching has been used in an attempt to match different database fields, such as customer, invoice number, amount due, dates of invoice, etc. Such searching may be performed on a field by field basis, with fixed rules for determining if a payment should be applied to a particular invoice. Even this method has proved insufficient to clear every payment received.

SUMMARY

A method of matching payments with invoices involves receiving a payment from a business partner. Multiple fields of an invoice database are concatenated to form a single string per record, and a search for an invoice corresponding to the payment is performed.

BRIEF DESCRIPTION OF THE DRAWINGS

FIG. 3 is a diagram illustrating an invoice database and corresponding concatenated data with example search string according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The functions or algorithms described herein are implemented in software or a combination of software and human implemented procedures in one embodiment. The software comprises computer executable instructions stored on computer readable media such as memory or other type of storage devices. The term "computer readable media" is also used to represent carrier waves on which the software is transmitted. Further, such functions correspond to modules, which are software, hardware, firmware or any combination thereof. Multiple functions are performed in one or more modules as desired, and the embodiments described are merely examples. The software is executed on a digital signal processor, ASIC, microprocessor, or other type of processor operating on a computer system, such as a personal computer, server or other computer system.

A method for clearing payments is described that first matches payment to outstanding invoices using fixed rules, and then matches payments using combinations of fields in an invoice database. If there are still unmatched or un-cleared payments, a fuzzy search is performed. Flowcharts are provided describing the process, and a representation of an invoice database with potential search string is provided.

Figure 1:
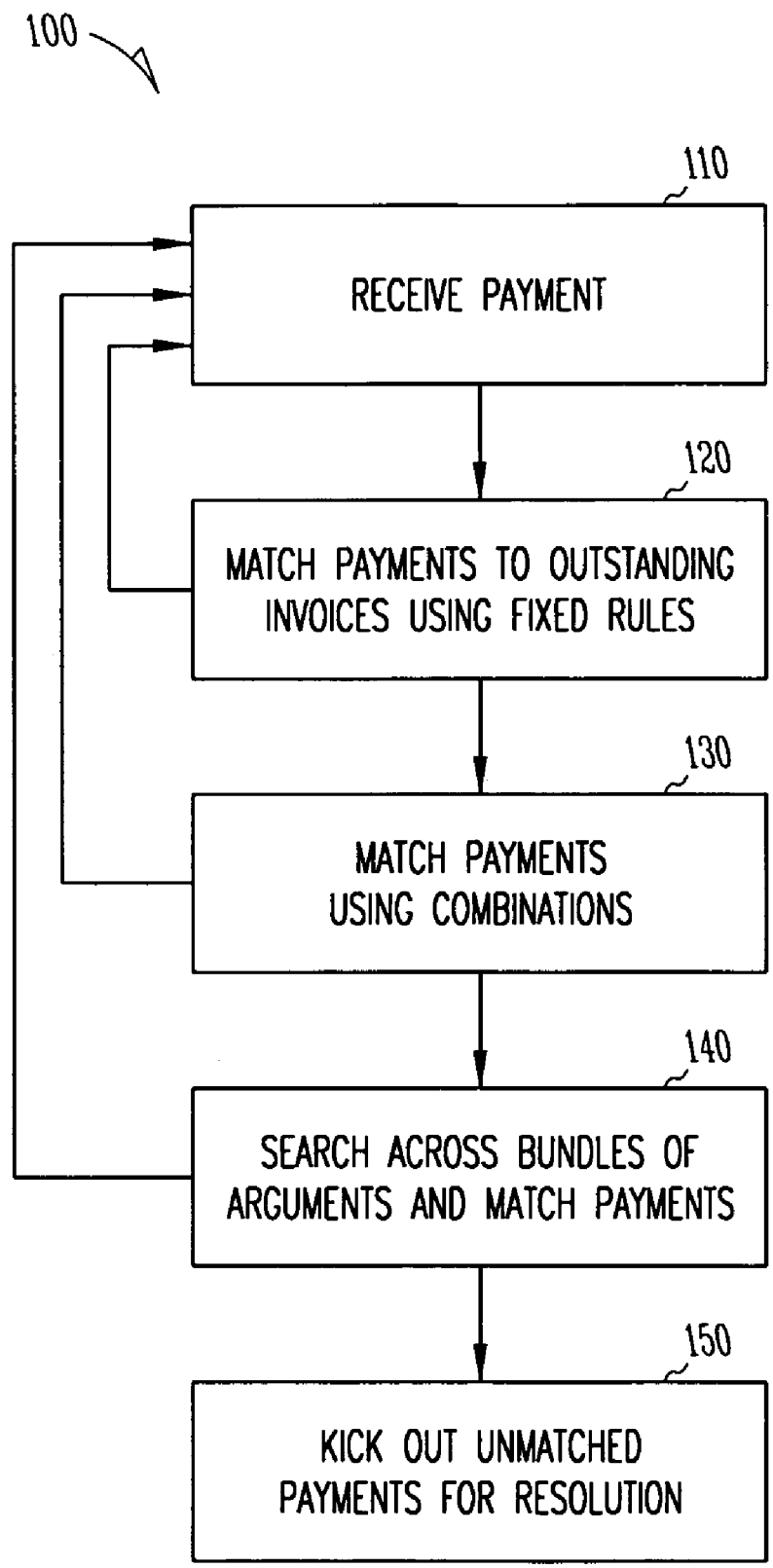
FIG. 1 is a flow chart illustrating a general method of matching payments with outstanding invoices according to an example embodiment.

FIG. 1 is a flowchart providing an overview of a process 100 for clearing received payments at 110 against outstanding invoices. Payments may come in many different forms, including but not limited to checks, cash, money transfer, cashier's check, electronic fund transfer, offsets against amounts owed, and other methods. Each payment may be reviewed by a person and either entered in a computer system or processed by the person. Electronic payments may be directly stored in the computer system without human intervention. With this great variety of payment methods, there may be many different ways of correlating a payment with an outstanding invoice. Perhaps the easiest way involves the use of fixed rules at 120.

One fixed rule comprises comparing an invoice identifier, such as an alphanumeric character string or number associated with the payment, such as one written on a received check, or on correspondence accompanying the payment with an outstanding invoice number. If the invoice numbers match, it is likely that the payment should be applied directly to the invoice with the same number. Another fixed rule might be that if only one invoice is outstanding from a customer or business partner, and a payment is received from the customer, the payment should be applied to that invoice. There are many other fixed rules that may be easily addressed in the same manner.

If application of the fixed rules do not match a payment to an invoice, a second method involving combinations of matches may be used. This may involve combinations of matches of database fields, such as customer and amount, if the amount is unique for that customer. In other words, if a customer has two invoices outstanding, with one for 40 and another for 66, and the payment received is for 66, then it is highly likely that the payment is for the 66 invoice, even if no invoice number was included with the payment. Many such combinations of fields may be used to correctly correlate a payment with an invoice, and clear the payment.

If the above methods still result in a payment not being cleared, a further method involves the use of a search string at 140. In the fuzzy search, the fields or arguments of each record in the invoice database are concatenated, and a search string may be applied against these bundles of arguments. If there are 10 fields, for example in an invoice database, the bundling of the records allows the use of standard search tools, such as searchable strings. The strings may include data included with a payment, and may allow the use of a fuzzy search. A fuzzy search may return results even when the string does not precisely correlate with the record. In one example, an invoice number may have two digits transposed. If one or more other selected arguments in the record match the data associated with the payment, the payment may be cleared against the corresponding invoice.

At each of the above methods, 120, 130 and 140, payments may be matched and cleared, and the next payment may be processed at 110. If none of the methods correlate a payment to an invoice, the payment may be kicked out as an unmatched payment and sent to another process for resolution. Such a process may be a human or a computer implemented method.

Figure 2:
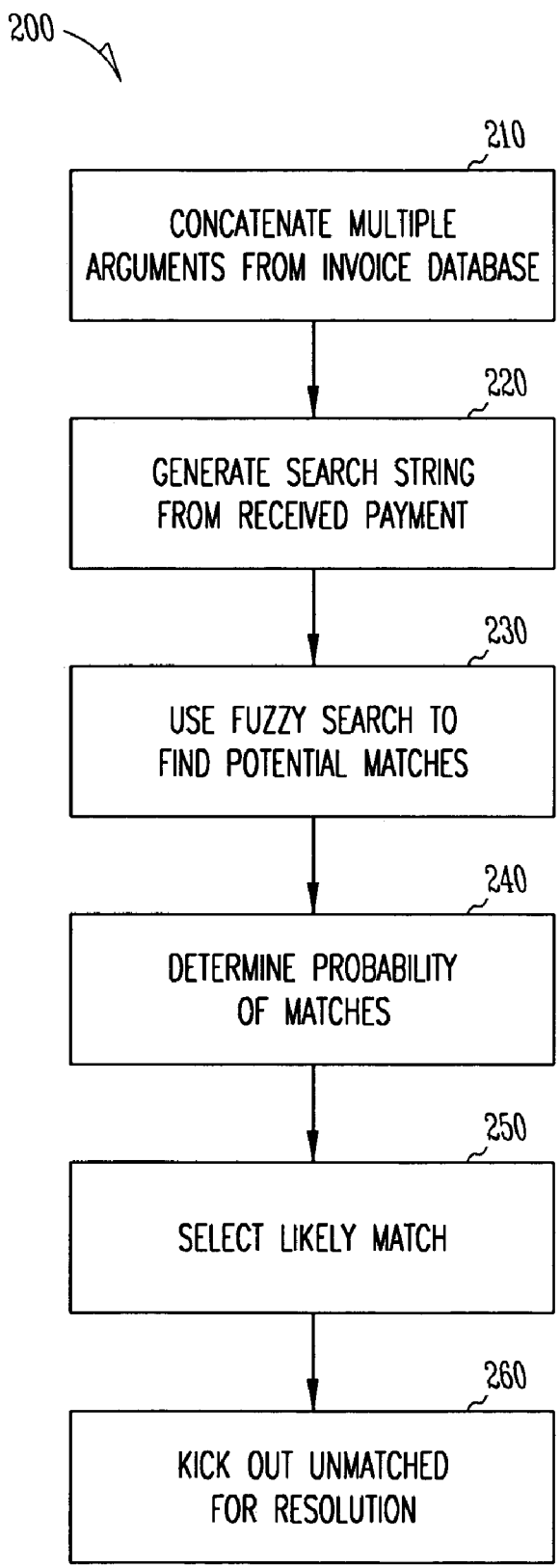
FIG. 2 is a flow chart illustrating the use of a string search on concatenated data according to an example embodiment.

Further detail of the use of search strings for searching an invoice database is illustrated at 200 in FIG. 2. At 210, multiple arguments from the invoice database are concatenated to provide bundles of arguments that are searchable. Each record in one embodiment is formed into such a bundle by concatenation of the fields. Fields in one embodiment may include, but are not limited to business partner or customer name, invoice date, invoice number, invoice amount, contract number, contacts, address, etc.

At 220, a search string is generated from information associated with an uncleared payment. The information may be information on a check, a cover letter, text associated with an electronic transfer, or other forms information that may be associated with a payment. The search string may be a Boolean logic string that may be created in multiple different manners. It may also be written in SQL, or other search language.

The search string is applied against the bundles of arguments using common search techniques at 230. In one embodiment, a fuzzy search is applied. The search may return one or more matches with varying probabilities of each match corresponding to the payment at 240. A likely match may be selected automatically from such matches at 250. If no matches are likely, it may be kicked out for further resolution at 260.

FIG. 3 illustrates an example abbreviated database at 300. The database comprises multiple fields, which correspond to columns of an invoice database as indicated 310. Such columns correspond to information associated with each invoice, such as business partner name, invoice date, invoice number, invoice amount, contract number, etc. These are just a few examples of the potential fields or columns of an invoice database. A single record is shown at 320 for Acme Inc. Each of the fields is populated with data if available.

The fields of each record are concatenated, or placed end to end in a single text string as indicated at 330 for the Acme Inc. record 320. A search string generated from a payment and associated information at 340. To illustrate the fuzzy nature of a search, two digits of the invoice number, which is "9742" in the database, are transposed in the payment information to read "9724" in the search string 340. The search string contains a matching business partner name and invoice amount, and so it returns the Acme Inc record corresponding to invoice 9742 as a high percentage, if not 100% match. In other words, the matching of multiple fields, combined with what appears to be a typographical error in the invoice number lead to a high probability that the correct invoice to apply the payment to has been found.

The search string in combination with the bundled records, allows a much more flexible and robust set of common search tools to be used in attempts to find matches. The percentage likelihood of the above match may be increased if no other similar records were found, or if other found records had a much lower probability of matching. Further, if two fields or information from a payment were transposed, such as mixing up the contract number and the invoice number, the search would still find the corresponding invoice. This would not likely occur in prior field based searching methods.

Figure 4:
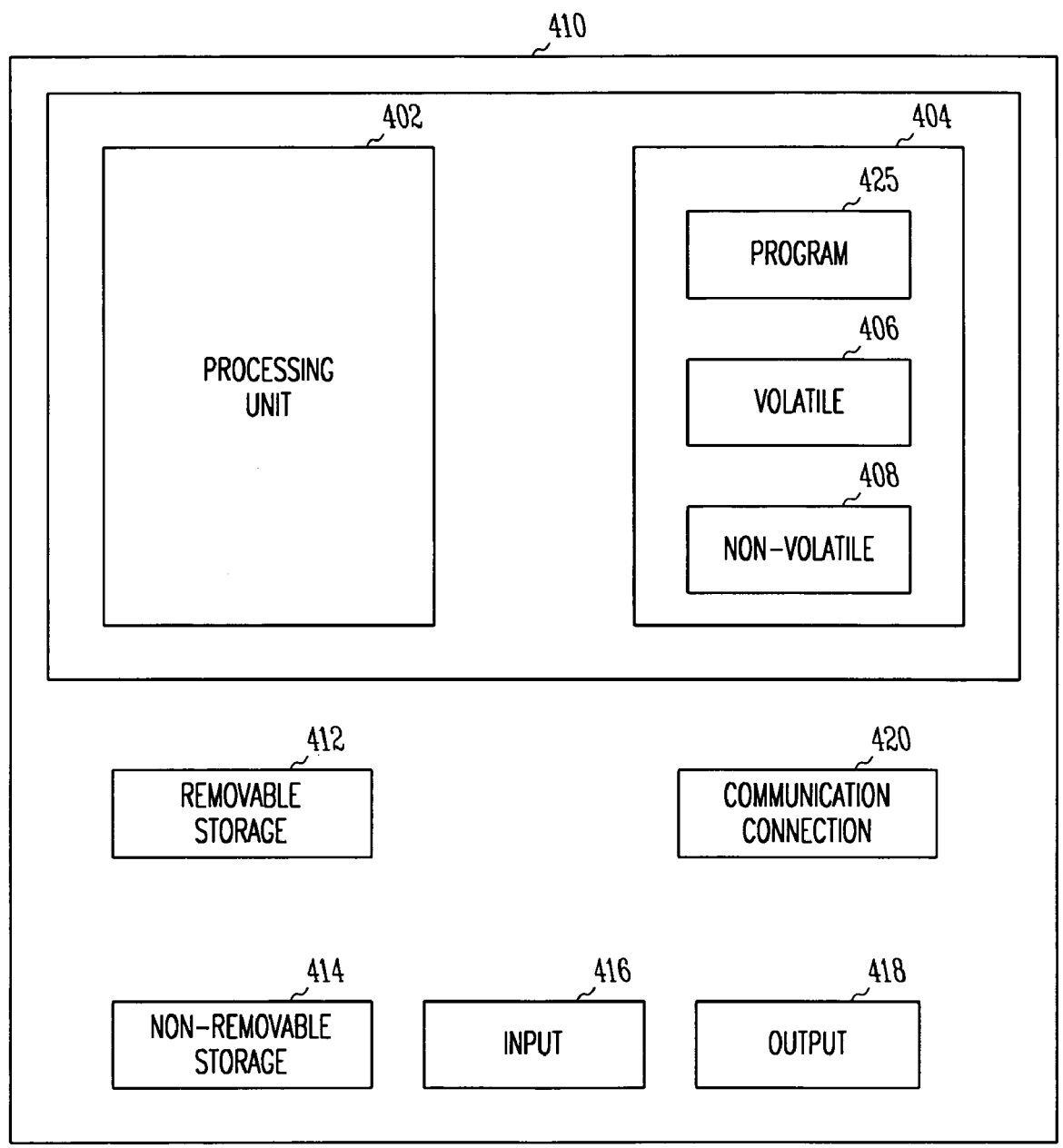
FIG. 4 is a block diagram of a computer system for performing the methods described herein.

A block diagram of a computer system that executes programming for performing the above functions is shown in FIG. 4. In one embodiment, multiple such computer systems are utilized in a distributed network to implement multiple components in a transaction based environment. An object oriented architecture may be used to implement such functions and communicate between the multiple systems and components. One example computing device in the form of a computer 410, may include a processing unit 402, memory 404, removable storage 412, and non-removable storage 414. Memory 404 may include volatile memory 406 and non-volatile memory 408. Computer 410 may include—or have access to a computing environment that includes—a variety of computer-readable media, such as volatile memory 406 and non-volatile memory 408, removable storage 412 and non-removable storage 414. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 410 may include or have access to a computing environment that includes input 416, output 418, and a communication connection 420. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 402 of the computer 410. A hard drive, CD-ROM, and RAM are some examples of articles including a computer-readable medium. The term "computer readable medium" is also used to represent carrier waves on which the software is transmitted. For example, a computer program 425 capable of providing a generic technique to perform access control check for data access and/or for doing an operation on one of the servers in a component object model (COM) based system according to the teachings of the present invention may be included on a CD-ROM and loaded from the CD-ROM to a hard drive. The computer-readable instructions allow computer 410 to provide generic access controls in a COM based computer network system having multiple users and servers.

The Abstract is provided to comply with 37 C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A computer implemented method comprising:
   receiving a payment from a business partner;
   concatenating multiple fields, via a computer, of a plurality of records of an invoice database stored on a storage device, the multiple fields of each record concatenated into a single string per record; and performing a fuzzy search, via the computer, on the concatenated fields in the strings based on data representative of the received payment.

2. The computer implemented method of claim 1 wherein the fuzzy search identifies close matches.

3. The computer implemented method of claim 2 wherein a close match comprises a number with two digits interposed.

4. The computer implemented method of claim 1 and further comprising clearing a payment that closely matches an invoice record found by the search.

5. The computer implemented method of claim 1 wherein the fields of each invoice is represented by a record that includes a date, an amount, an invoice identifier, and a business partner name.

6. The computer implemented method of claim 1 wherein the search returns records with a likelihood of match to the payment.

7. The computer implemented method of claim 6 wherein a match of business partner and payment amount combined with a close invoice number is identified as a match.

8. The computer implemented method of claim 1 wherein the search is conducted using a search string.

9. The computer implemented method of claim 8 wherein the search string comprises a Boolean search string.

10. The computer implemented method of claim 8 wherein the search string comprises a search statement in a database language.

11. The computer implemented method of claim 8 wherein the search string is a function of information associated with the payment.

12. The computer implemented method of claim 1 wherein the fuzzy search is based on the received payment and is performed on all the concatenated fields independent of an expected field in which a search term would usually be found.

13. The computer implemented method of claim 1 wherein the fuzzy search comprises search terms derived from information contained in the received payment to correlate the payment with an invoice.

14. A computer implemented method comprising:
  receiving a payment from a business partner;
  applying fixed rules to correlate an invoice with the received payment, via a computer; and
  if the fixed rules do not correlate the invoice with the received payment, concatenating multiple fields of records in an invoice database, stored on a storage medium, the multiple fields of each record concatenated into a string for a respective record, and performing, via the computer, a fuzzy search on the concatenated fields as a function of information in the received payment to correlate the invoice with the received payment.

15. The computer implemented method of claim 14 wherein the fixed rules include checking combinations of fields of the invoice database.

16. The computer implemented method of claim 14 wherein the search is conducted using a search string.

17. The computer implemented method of claim 16 wherein the search string comprises a Boolean search string.

18. The computer implemented method of claim 16 wherein the search string is a function of information associated with the payment.

19. A system for clearing payments, the system comprising:
  means for receiving a payment from a business partner;
  a module that applies fixed rules to correlate an invoice with the received payment; and
  a module that correlates the invoice with the received payment, concatenates multiple fields of an invoice database and performs a fuzzy search on the concatenated fields.

20. The system of claim 19 and further comprising means for clearing a payment that closely matches an invoice record found by the fuzzy search.

21. The system of claim 19 wherein the fuzzy search is based on a search string generated from information associated with the payment.

22. A computer implemented method comprising:
  receiving a payment from a business partner that includes information related to an invoice;
  concatenating, via a computer, multiple fields of an invoice database stored on a storage medium;
  generating a search string, via the computer, based on the information included with the received payment, wherein the search string contains search terms related to multiple fields of the invoice database; and
  performing a fuzzy search, via the computer, on the concatenated fields using the search string.

23. The computer implemented method of claim 22 wherein performing a fuzzy search on the concatenated fields results in identification of an invoice even if the information in the received payment is associated with an incorrect invoice field.

24. The computer implemented method of claim 22 wherein the performed fuzzy search includes a fuzzy search such that transposed characters in the information in the received payment result in identification of an invoice.

* * * * *

UNITED STATES PATENT AND TRADEMARK OFFICE
CERTIFICATE OF CORRECTION

PATENT NO. : 7,664,704 B2 Page 1 of 1
APPLICATION NO. : 11/322570
DATED : February 16, 2010
INVENTOR(S) : Ripp et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 838 days.

Signed and Sealed this

Twenty-eighth Day of December, 2010

David J. Kappos
*Director of the United States Patent and Trademark Office*